United States Patent
Ante

(10) Patent No.: US 7,415,875 B2
(45) Date of Patent: Aug. 26, 2008

(54) BELT FORCE MEASURING DEVICE

(75) Inventor: Johannes Ante, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 344 days.

(21) Appl. No.: 10/892,387

(22) Filed: Jul. 15, 2004

(65) Prior Publication Data

US 2005/0057033 A1    Mar. 17, 2005

(30) Foreign Application Priority Data

Aug. 19, 2003  (DE) .............................. 103 38 057

(51) Int. Cl.
*G01L 1/04* (2006.01)
*G01N 3/26* (2006.01)
(52) U.S. Cl. ....................................................... 73/161
(58) Field of Classification Search .................... 73/161
See application file for complete search history.

(56) References Cited

U.S. PATENT DOCUMENTS

| | | | |
|---|---|---|---|
| 4,913,497 A * | 4/1990 | Knabel et al. ............... 297/480 |
| 5,960,523 A * | 10/1999 | Husby et al. ................... 24/633 |
| 6,209,915 B1 | 4/2001 | Blakesley |
| 6,230,088 B1 | 5/2001 | Husby |
| 6,352,312 B1 | 3/2002 | Rees |
| 6,595,545 B2 * | 7/2003 | Curtis et al. ................. 280/735 |
| 6,679,524 B2 * | 1/2004 | Greib et al. ............... 280/801.1 |
| 6,722,212 B2 * | 4/2004 | Specht ................... 73/862.381 |
| 6,857,326 B2 * | 2/2005 | Specht et al. ........... 73/862.393 |
| 7,021,162 B2 * | 4/2006 | Ante et al. ............. 73/862.391 |
| 2002/0038573 A1 | 4/2002 | Clark |
| 2004/0040393 A1 | 3/2004 | Specht et al. |

FOREIGN PATENT DOCUMENTS

| DE | 102 10 330 A1 | 10/2003 |
|---|---|---|
| DE | 102 40 896 A1 | 3/2004 |
| DE | 10243344 A1 * | 4/2004 |

* cited by examiner

*Primary Examiner*—Edward Lefkowitz
*Assistant Examiner*—Octavia Davis
(74) *Attorney, Agent, or Firm*—Lucas & Mercanti, LLP

(57) ABSTRACT

A belt force measuring device has a measuring spring (12), of which the strain is a measure of the belt force. The measuring spring (12) is arranged and formed as a tension spring in such a way that, depending on the belt force, the spring extends between first and second mountings. A strain measuring structure (23), which is rigidly arranged on the measuring spring (12), is integrated in a housing (2) of a belt buckle (1).

11 Claims, 2 Drawing Sheets

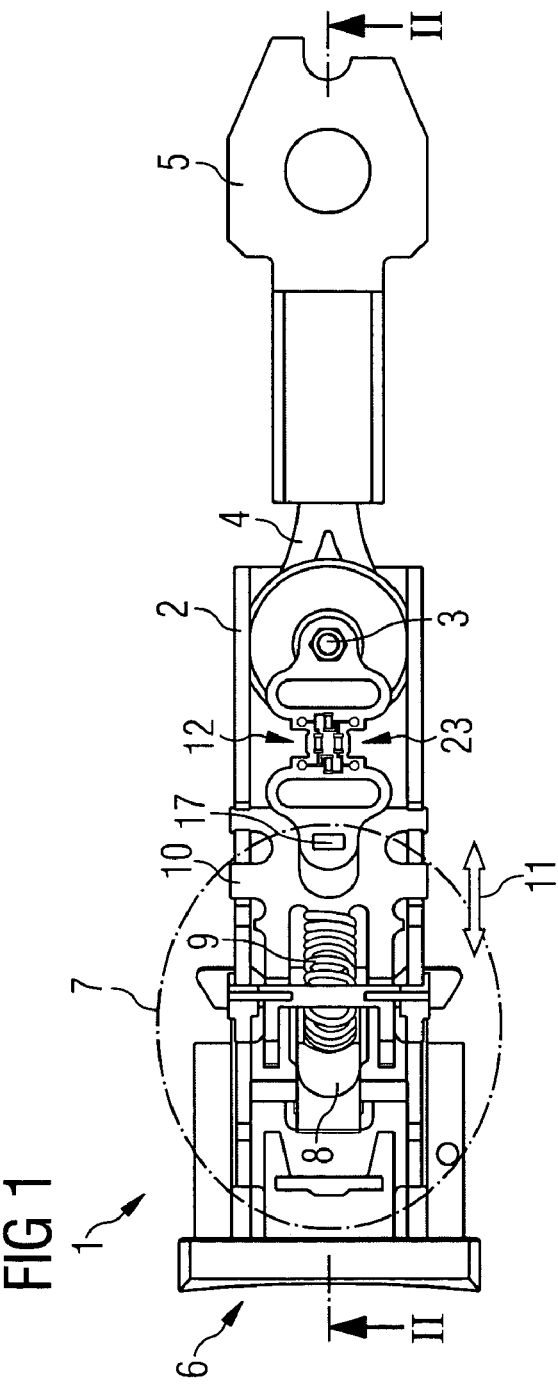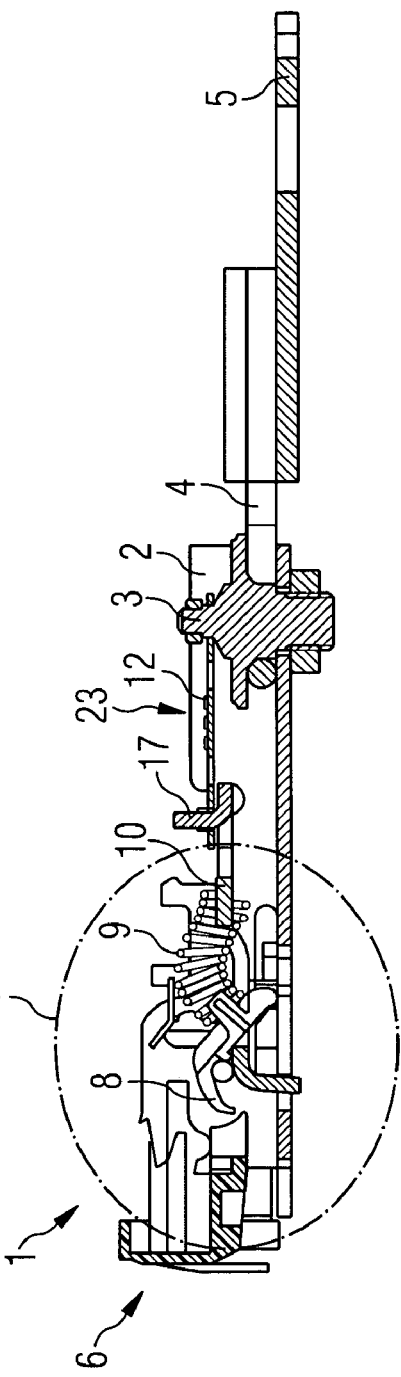

BELT FORCE MEASURING DEVICE

FIELD AND BACKGROUND OF THE INVENTION

The invention relates to a belt force measuring device for measuring a tensile belt force acting on a belt buckle in a motor vehicle.

For improved occupant protection in a passenger car, it is necessary to measure the force on the belt of a strapped-in person. The data are processed and used for example during an accident to calculate the optimum deployment of belt pretensioners and airbags.

A further important application for such a device is the reliable detection of a child seat which is arranged on a seat of the vehicle and fixed by a safety belt. Especially a very small child who is strapped in on a Styropor seat exerts a very small force on the seat of the vehicle when there is a belt force deviating slightly from zero. Consequently, a device for detecting the tensile force of a belt has to meet high requirements in order also to be safe and reliable in a low measuring range.

U.S. Pat. No. 6,230,088 B1 discloses a belt buckle housing which is connected via a belt force measuring device to an anchorage which is fastened to the body of a vehicle. The belt force measuring device comprises a first part, which is coupled to the belt buckle, and on which a transmitter formed as a magnet is arranged. Also provided is a second part, which is coupled to the anchorage. Arranged on the second part is a sensor element, which is formed as a magnetoresistive or GMR sensor. The first and second parts are connected by means of two springs, which are respectively coupled to each other in the freely resting state. The force on the belt induces a deformation of the spring elements, so that the distance between the transmitter and the sensor element changes, which is evaluated as a measuring signal for the belt force.

Such a belt force measuring device has the disadvantage that a shift of the characteristic curve of the sensor often occurs during operation of the vehicle, i.e. there is a zero shift. Furthermore, the measuring signals also have undesirable hysteresis.

It is also known to perform the displacement measurement on a resilient element lying in the flux of force. Such a device is similar to a spring balance. An increased force extends the resilient element; the elongation is measured and converted into an electrical signal, for example by means of a linear HALL cell or a differential transformer. The displacement is in this case usually measured between the spring support and the housing. An example of such a device is disclosed in U.S. Pat. No. 6,352,312 B1.

In a passenger car, however, in particular near a belt buckle, disturbing magnetic interference fields increasingly occur, emitted for example by magnetic or magnetized key fobs, retrofitted loudspeaker enclosures, etc. The magnetic field acting on the region of the belt buckle as a result must not lead to incorrect measurements, since otherwise the control of the airbag is misled. Therefore, various car manufacturers require a magnetic field test with a magnetic field with a strength of 1.3 T, which must not significantly influence the sensor. Adequately shielding a linear Hall measuring element from such an interference field is virtually impossible at an acceptable cost.

SUMMARY OF THE INVENTION

The object of the invention is to provide a belt force measuring device which is reliable, tolerant to magnetic fields and precise during operation of a belt force measuring device.

The object is achieved by the features of the independent patent claim. The invention is accordingly based on the finding that the requirements set out in the object can be met very well by the use of strain gages. To be able to increase the sensitivity of the measurement, a spring element in the form of a measuring spring is introduced and is arranged by means of a first mounting and a second mounting in the flux of force in such a way that, depending on the belt force, it extends between the first and second mountings. Arranged at or on the measuring spring is the strain measuring sensor. A preferred sensor arrangement is described in further detail below with reference to the drawing. The arrangement according to the invention is advantageously very compact, since the measuring spring is arranged such that it is integrated in a housing that is in any case present of a respective belt buckle, in particular in the manner of a further element in a chain of force or traction of the belt over a number of elements. Advantageous refinements of the invention are characterized in the subclaims.

A measuring device is intended to measure belt forces in the range of 0-150 N with an accuracy of about +/−2.5%. During normal operation, belt forces of up to 10,000 N may occur. These must not lead to damaging of the measuring device or the belt buckle. During an accident, the belt force may increase to up to F=20,000 N, under which it is permissible for the belt buckle and the measuring device to undergo permanent deformation but not to fail. Therefore, a mechanical stop which is provided in the housing and/or the belt buckle is used as overload protection for the measuring spring. The stop automatically occurs as from a predetermined maximum loading caused by the strain of the measuring spring. Both the belt buckle and the housing must be designed for the aforementioned maximum belt forces. Consequently, it does not involve any further appreciable extra expenditure to provide the proposed safeguard against overloading.

In a development of the invention, the measuring spring is arranged such that its extension, dependent on the belt force, is preferably mechanically limited by the play of a locking tab mounted with play in a housing of the belt force measuring device. Since a belt force measuring device according to the invention is integrated in an existing belt buckle and so can also use the locking and overload protection device of the latter, the additional structural and assembly-related expenditure for the measuring system is comparatively low. The measuring system described in further detail below may be supplied as a complete electronic component to the belt buckle manufacturer and be fitted at the manufacturer's as a subassembly.

The measuring spring is preferably mounted in an articulated manner in the first mounting. Consequently, it can be ensured independently of the configuration of a respective closure mechanism of the actual belt buckle that no bending stresses are transferred to the measuring spring. Consequently, measuring errors or major deviations caused by bending stresses within the measuring spring are avoided. The bending that otherwise possibly occurs due to transverse forces produces a certain amount of friction and friction-induced hysteresis on a locking tab of the measuring spring, but no bending-induced incorrect measurements, since the bending is not passed on to the measuring spring. In one embodiment, the measuring spring is also mounted in an articulated manner in the second mounting, in order also not to transfer any bending stresses to the measuring spring from the opposite side. Moreover, the measuring spring is preferably also arranged in the housing in a manner preventing torsion, which is advantageously likewise accomplished by means of one of the mountings.

In one embodiment, the sensor element comprises at least one strain measuring sensor printed on the measuring spring in the form of a strain measuring structure. Thick-film and thin-film elements may be used for this. In an alternative embodiment, the sensor element comprises at least one strain measuring structure which is applied to the measuring spring as a chip strain measuring sensor by a vitreous or other process. A silicon strain gage component is preferably used as the strain gage. This component is constructed for example in accordance with the teaching of the international patent application WO 01/08227 A1. This is a measuring bridge which is only about 8 μm thick and is the result of a thinning process carried out on a semiconductor layer with indiffusions.

The problem of a zero shift occurring in the case of all devices due to displacement of the support and hysteresis due to friction of the support is avoided by the direct fixing of the strain measuring structures on the measuring spring. Furthermore, resistive strain measuring resistors do not change their properties even in magnetic fields; therefore, the system accuracy is not impaired by interfering magnetic fields, as is the case in particular with Hall measuring sensors.

The sensor element is preferably formed as a bridge circuit comprising strain measuring sensors of the same type. In particular, the structural form of a Wheatstone bridge circuit, in which two strain measuring sensors are used for measurement and two further strain measuring sensors are used as references, is chosen.

If the belt buckle is overloaded, the overload is taken up substantially by the locking mechanism. Until this comes into contact, the measuring spring is extended. A very strong measuring spring, which elastically bears this load, can be realized in combination with very good fitting accuracy of all the components of the measuring spring. To be able to reduce these accuracy requirements significantly, a measuring spring is preferably made rather "too short". After or during assembly in a belt buckle, a respective length in use or operating length is set by subjecting it to force in a substantially one-off operation. In order not to damage the actual measuring bridge during this stretching, the deformation is deliberately directed into a zone other than that of the measuring bridge. In a significant development of the invention, the measuring spring therefore has at least two zones of different spring rigidity between the fastening points or points of force introduction. The zones lie in series with each other. They therefore substantially enclose the region of the measuring structure.

In one embodiment of the invention, the measuring spring has two zones with lower spring rigidity, which adjoin a zone of higher spring rigidity. The measuring sensor is arranged in the zone of higher spring rigidity. In this case, the measuring spring can be set in its overall length by means of a deformation of the zones with lower spring rigidity, so that the measuring spring can be prestressed even in the position of rest. Thermal softening, for example by induction, of this zone may be used here during the stretching operation if the plasticity of the material is not adequate.

In this case, the fastening points or points of force introduction of the measuring spring may also be formed in a manner preventing torsion, in that a mounting of the measuring spring of an at least double configuration is provided. Preferably a pin which passes through a clearance or engages behind it is respectively chosen. If the pin and clearance are formed in an elongated manner, such that they match each other and are substantially perpendicular to a direction of loading, adequate prevention of torsion is likewise obtained for the measuring spring with just a single mounting. The last-mentioned solution is distinguished in this case by simplified production.

BRIEF DESCRIPTION OF THE DRAWINGS

To present further features and advantages of the device according to the invention, the present invention is explained in more detail below on the basis of an exemplary embodiment with reference to the accompanying drawing, in which:

FIG. 1 shows a plan view of a belt buckle with a belt force measuring device,

FIG. 2 shows a section through the belt buckle with the belt force measuring device according to FIG. 1 along a line II,II'.

DETAILED DESCRIPTION OF THE PREFERRED EMBODIMENT

Figure 3:
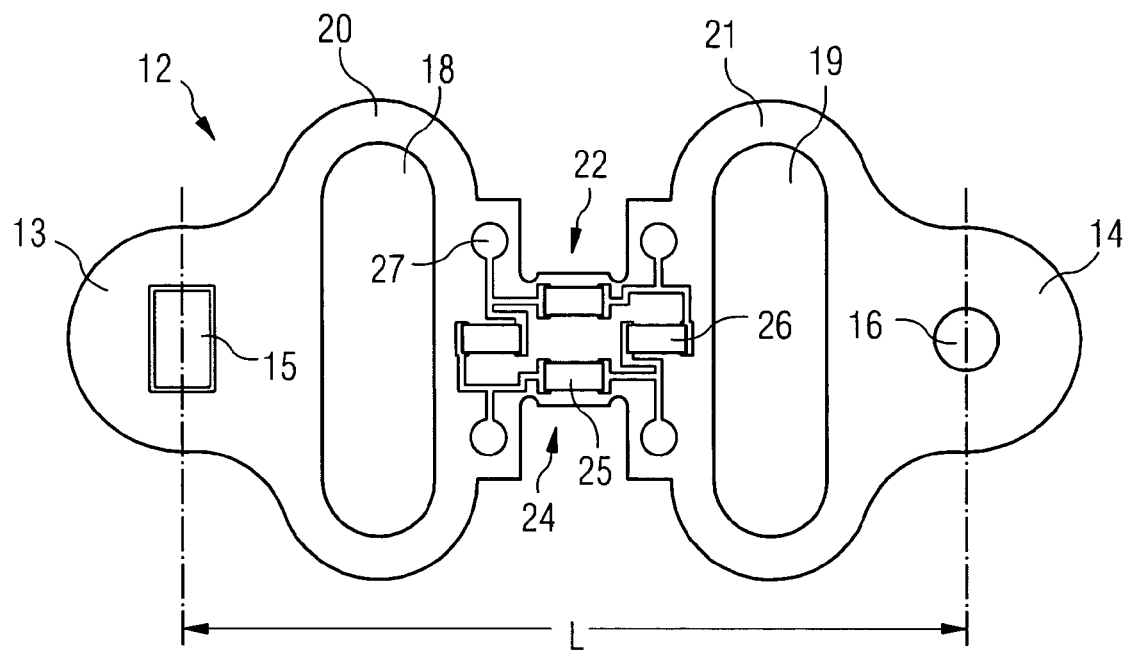
FIG. 3 shows a measuing spring which is arranged in the belt force measuring device according to FIGS. 1 and 2.

Elements of the same construction and function are provided with the same reference numerals throughout the figures.

In FIG. 1, an opened belt buckle 1 is represented in plan view, as it is used in a known way in a motor vehicle (not represented any further). The belt buckle 1 comprises a housing 2, into which a rivet 3 is set with positive engagement. The rivet 3 connects the housing 2 via a cable 4 to an anchor 5. The anchor 5 is finally fastened to the body of the vehicle or else to a seat of the vehicle. Provided in the housing 2 is a slit 6 for the insertion of a counterpart, which is not represented any further. The counterpart is coupled in a known way to a belt, in order to create a safety device generally in the form of a three-point belt.

Also provided in the housing 2 of the belt buckle 1 is a locking and unlocking device 7, which locks and unlocks the counterpart in the belt buckle 1. The locking and unlocking device 7 comprises a latching part 8, which is made of plastic, and also a spring 9. The spring 9 is coupled on the one hand to the latching part 8 and on the other hand to a locking tab 1 The locking and unlocking device 7 is in this case formed and arranged in such a way that the flux of force in the latched state of the latching part 8 takes place from the counterpart via the latching part 8 directly to the locking tab 10.

The locking tab 10 is mounted with play in the housing 2 in such a way that it can move back and forth parallel to an axis 11. An axial play permitting this freedom of movement approximately in a range of 1 mm is chosen for this.

The locking tab 10 is coupled to a measuring spring 12. The measuring spring 12 is coupled at a free end 13 to the rivet 3 and consequently to the housing 2. When the counterpart is locked, the force acting in the belt is consequently transferred via said counterpart and subsequently the latching part 8, the locking tab 10, the measuring spring 12, the rivet 3 and finally to the anchor 5, as long as the force is not yet great enough to make the locking tab 10 reach one of its stop points on the housing 2 within the limits of its mounting provided with play. As soon as the locking tab has reached one of its stop points, part of the force is then transferred directly from the locking tab 10 via the housing 2 and the rivet 3 to the anchor 5.

The measuring spring 12 has a number of portions. Arranged opposite the free end 13 is a free end 14. Both free ends 13, 14 have elongate clearances 15, 16 for fixing in the force of flux of the belt buckle 1. The clearance 15 is coupled to the locking tab 10 in an articulated manner by means of a pin 17. Together with the rivet 3, the clearance 16 forms a second mounting of the measuring spring 12, which is rigidly formed here. The clearances 15 and 16 consequently serve for fixing the measuring spring 12 in the belt buckle 1 and for the introduction of force. It must be taken into consideration in this respect that the locking tab 10 exerts an at least partly rotating movement during use, so that bending stresses can be transferred to the measuring spring 12.

A first mounting of the measuring spring 12 takes place at the free end 13 by means of the clearance 15 and the pin 17, which are formed in such a way that the mounting takes place in an articulated manner. This ensures that no bending forces can be transferred from the locking tab 10 to the measuring spring 12 and vice versa, which would falsify the measuring signal. The pin 17 and the clearance 15 are formed such that they match each other and are substantially perpendicular to a direction of loading. With simple production, this provides not only an articulated connection but also adequate prevention of torsion for the measuring spring 12, in particular under the effect of force. The second mounting, i.e. the coupling of the circular clearance 29 to the rivet 3, is also formed in an articulated manner, so that here, too, no bending forces can be transferred to the measuring spring 12 and consequently a falsification of the measuring signal is also prevented from this side.

Two substantially oval clearances 18, 19 are provided in the measuring spring 12 between the free ends 13, 14 of the measuring spring 12. As a result, two regions 20, 21 of low spring rigidity are created around the clearances 18, 19 and can be used to compensate for tolerances and also for adaptation of an overall length L of the measuring spring 12. The regions 20, 21 are connected to each other by a portion 22 with greater spring rigidity and correspondingly lower elongation under loading.

In the exemplary embodiment represented, the measuring spring 12 has been punched out from 420 steel sheet in one piece. In the region of the portion 22, a strain measuring structure 23 has been applied by a process. A thick-film process has been used for this purpose. Still greater accuracy can be achieved with a measuring spring of 17-4PH and thin-film strain gage resistors or micro-strain gages applied by a vitreous process. The sensor element is formed as a strain measuring structure 23, preferably in the form of an ASIC, and also comprises evaluation and signal conditioning electronics.

A graphic representation of these variations is not provided here, since these solutions are all based on the fitting of the measuring spring 12 and, by being fastened directly on the measuring spring 12 in a special region, the portion 22, operate without any appreciable hysteresis losses. The measuring signal of the sensor element is consequently characteristic of the force acting on the measuring spring 12.

The exemplary embodiment shown of a belt buckle 1 with an integrated force measuring device has a measuring spring 12 with a Wheatstone bridge 24 applied to it by a process as a strain measuring structure 23. The resistors 25 represented next to one another in the portion 22 supply the actual measuring signal. The resistors 26 arranged individually in the regions 20, 21 serve as a reference. The signals are picked off in a known way by means of contact points 27 and passed on for conditioning and further processing.

The spring constant of the complete measuring spring 12 is chosen such that the force range to be measured, which is for example 0 to 150 N, is sensed by the sensor element. Every loading from the detection of a small belt force when fixing a child seat up to airbag activation for an adult in the event of an accident can be reliably measured. That is to say that the deflection of the measuring spring 12 under the maximum force to be sensed must be such that the locking tab 10 has not quite reached its point of contact within the housing 2 when this force occurs. If the force which is transferred from the belt increases beyond a value that lies above the value which leads to a deflection of the measuring spring 12 under which the measuring spring 12 is in contact with its stop via the locking tab 10, the force transferred via the measuring spring 12 remains constant and limited even if the force increases further. The spring 12 is supported by means of the housing 2 and is in this way protected against overloading. This then ensures that the measuring spring 12 is not plastically deformed in the case of use and is consequently always reliably and durably operative.

In the exemplary embodiment described above, the measuring spring 12 is formed as a part punched from a spring steel strip. It may, however, also be formed by a person skilled in the art in its function as a tension spring with a strain measuring structure 23 as a wire bending spring with corresponding loops for fixing and regions for the resistors 25, 26 or an ASIC chip.

In any event, the measuring spring 12 can be integrated in the way represented in the housing 2 of a known belt buckle 1. Special adaptation of the already existing parts is not required to any great extent for this purpose. The belt force sensor needs protection from external influences by a housing or covering, but the housing 2 of the belt buckle 1 may be used for this purpose in the way described above. Only slight lengthening of the housing 2 is required for this purpose.

The use of at least one strain measuring structure 23 directly connected to the measuring spring 12 has the effect that the operating mode using the measurement of a strain of the measuring spring 12 under tension is insensitive even to strong magnetic fields. Furthermore, the measurement of the type described above produces adequately accurate results even in a lower measuring range to reliably detect for example a child seat for an infant that is positioned on a seat of the vehicle and fixed by means of a belt. Specifically in the case of lightweight configurations made of Styropor or other lightweight foams, detection errors occur in the case of known devices on account of the low force exerted by the seat and an insignificant belt force. In the case of a heavier arrangement, which is restrained on the seat of the vehicle substantially by the belt being under a greater belt force, an adult is detected instead of a child by the known methods and the corresponding devices. This incorrect conclusion may be highly dangerous, in particular in the case of an airbag being deployed for a child. The device according to the invention allows the respective belt force to be determined reliably and with little interference, so that significant sources of error can be eliminated: the spring element 12 is under prestress and the measuring structure 23 responds immediately. The integrated overload protection with the interaction of the locking tab 10 and the housing 2 of the belt buckle 1 thereby guarantees an error-free function even after repeated, high loading of the belt force measuring system with an overload of over 10 times.

I claim:

1. A belt force measuring device with a measuring spring (12), which spring is arranged in the flux of a force and a strain of which spring is a measure of the belt force, wherein the measuring spring (12) is formed in such a way and arranged by means of a first mounting and a second mounting in the flux of force such that, depending on the belt force, the spring extends between the first and second mountings, the force measuring device further comprises a strain measuring structure (23) being arranged at or on the measuring spring (12), the measuring spring being formed as a tension spring, and wherein the measuring spring (12) is arranged such that it is integrated in a housing (2) of a belt buckle (1);

and wherein the strain measuring structure (23) is a strain gauge, the measuring spring (12) has two regions (20, 21) with lower spring rigidity, which two regions are connected by means of a portion (22) of higher spring rigidity, and there is at least one of said strain measuring structure (23) arranged in the portion (22) of higher spring rigidity.

2. The belt force measuring device as claimed in claim 1, wherein that the measuring spring (12) is arranged such that its extension, dependent on the belt force, is mechanically limited by the play of a locking tab (10) mounted in the housing (2) of the belt force measuring device.

3. The belt force measuring device as claimed in claim 1, wherein that the measuring spring (12) is mounted in an articulated manner in the first mounting.

4. The belt force measuring device as claimed in claim 1, wherein the measuring spring (12) is mounted in an articulated manner in the second mounting.

5. The belt force measuring device as claimed in claim 1, wherein the measuring spring (12) is arranged in the housing (2) in a manner preventing torsion.

6. The belt force measuring device as claimed in claim 1, wherein there is at least one of said strain measuring structure (23) constituting a sensor element and being printed on the measuring spring (12).

7. The belt force measuring device as claimed in claim 6, wherein the sensor element further comprises at least one chip strain measuring sensor applied to the measuring spring (12) by a vitreous or other process.

8. The belt force measuring device as claimed in claim 6, wherein the sensor element is formed as a bridge circuit comprising strain measuring sensors of the same type.

9. The belt force measuring device as claimed in claim 1, wherein the measuring spring (12) has at least two regions (20, 21, 22) of different spring rigidity, which two regions lie in series with each other, between fastening points or points of force introduction.

10. The belt force measuring device as claimed in claim 1, wherein the measuring spring (12) can be set in its overall length (L) by means of a deformation of the two regions (20, 21) with lower spring rigidity.

11. The belt force measuring device as claimed in claim 1, wherein the measuring spring (12) is formed as a spring steel strip.

* * * * *